(12) United States Patent
Hamilton

(10) Patent No.: US 9,849,842 B1
(45) Date of Patent: Dec. 26, 2017

(54) RESETTABLE TRANCEIVER BRACKET

(71) Applicant: GM GLOBAL TECHNOLOGY OPERATIONS LLC, Detroit, MI (US)

(72) Inventor: David P. Hamilton, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/234,187

(22) Filed: Aug. 11, 2016

(51) Int. Cl.
| | | |
|---|---|---|
| *B60R 11/00* | (2006.01) | |
| *G01S 13/93* | (2006.01) | |
| *G01S 17/93* | (2006.01) | |
| *B60R 11/02* | (2006.01) | |
| *G01S 13/02* | (2006.01) | |
| *B60R 19/48* | (2006.01) | |

(52) U.S. Cl.
CPC .......... *B60R 11/02* (2013.01); *G01S 13/0218* (2013.01); *G01S 13/931* (2013.01); *B60R 11/00* (2013.01); *B60R 19/483* (2013.01); *B60R 2011/004* (2013.01); *G01S 17/936* (2013.01); *G01S 2013/9371* (2013.01)

(58) Field of Classification Search
CPC ............... B60R 11/00; B60R 2011/004; B60R 2011/0057; B60R 2011/008; B60R 2011/0085; B60R 19/483; F16M 11/06; G01S 17/936; G01S 13/931; G01S 2013/9371
USPC ........................................ 224/545, 548, 553
See application file for complete search history.

(56) References Cited

U.S. PATENT DOCUMENTS

| | | | | |
|---|---|---|---|---|
| 4,667,915 A | * | 5/1987 | Boucher | ................. B63B 17/00 248/292.13 |
| 4,682,560 A | * | 7/1987 | Lieb | ........................ B63B 17/00 114/284 |
| 6,157,294 A | * | 12/2000 | Urai | ......................... B60Q 1/52 307/10.1 |
| 8,269,652 B2 | | 9/2012 | Seder | |
| 9,348,014 B2 | * | 5/2016 | Lee | ......................... G01S 17/936 |
| 9,361,873 B2 | * | 6/2016 | Cicero | .................... B63B 17/00 |
| 9,440,593 B2 | * | 9/2016 | Sakamoto | ............. F16B 5/0241 |
| 9,682,728 B2 | * | 6/2017 | Taneda | ................. B62D 25/085 |
| 2002/0125383 A1 | * | 9/2002 | Takahashi | ............. B60R 19/483 248/200 |
| 2005/0062641 A1 | * | 3/2005 | Kakishita | .................. G01S 7/03 342/70 |

(Continued)

*Primary Examiner* — Justin Larson
(74) *Attorney, Agent, or Firm* — General Motors LLC Legal Staff

(57) ABSTRACT

A resettable bracket is herein presented. The bracket is configured to mount a transceiver to a vehicle. The bracket includes a first piece and a second piece configured to be pivotably connected to each other. A docking station is mounted to the first piece. The docking station includes a bluff, an over-travel stop, and a plurality of arms configured to restrict pivotable movement of the second piece in relation to the first piece. A fitting element is mounted to the second piece. The fitting element is configured to dock into the docking station to substantially create the pivotable connection between the first and the second piece. A spring is installed at the pivotable connection between the first and second pieces. The spring is configured to allow the second piece to automatically return to a default position after being pivoted in relation to the first piece.

20 Claims, 4 Drawing Sheets

(56) References Cited

U.S. PATENT DOCUMENTS

| | | | | |
|---|---|---|---|---|
| 2014/0354465 A1* | 12/2014 | Lee | ................... | G01S 17/936 |
| | | | | 342/70 |
| 2015/0283955 A1* | 10/2015 | Sakamoto | ............ | F16B 5/0241 |
| | | | | 248/636 |
| 2016/0093945 A1* | 3/2016 | Grodahl | ............... | H01Q 1/3275 |
| | | | | 248/514 |
| 2016/0297437 A1* | 10/2016 | Hara | ................... | B60R 11/04 |
| 2017/0088077 A1* | 3/2017 | Kumai | ................. | B60R 19/483 |
| 2017/0232909 A1* | 8/2017 | Kuehnle | ................. | B60R 11/04 |
| | | | | 396/419 |

* cited by examiner

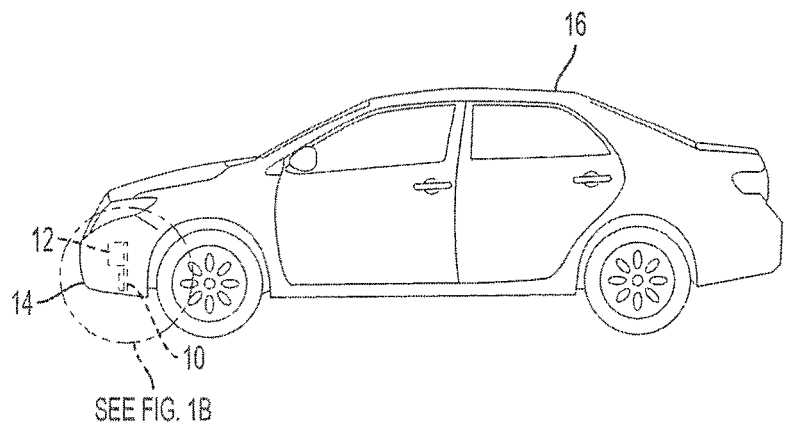
FIG. 1A
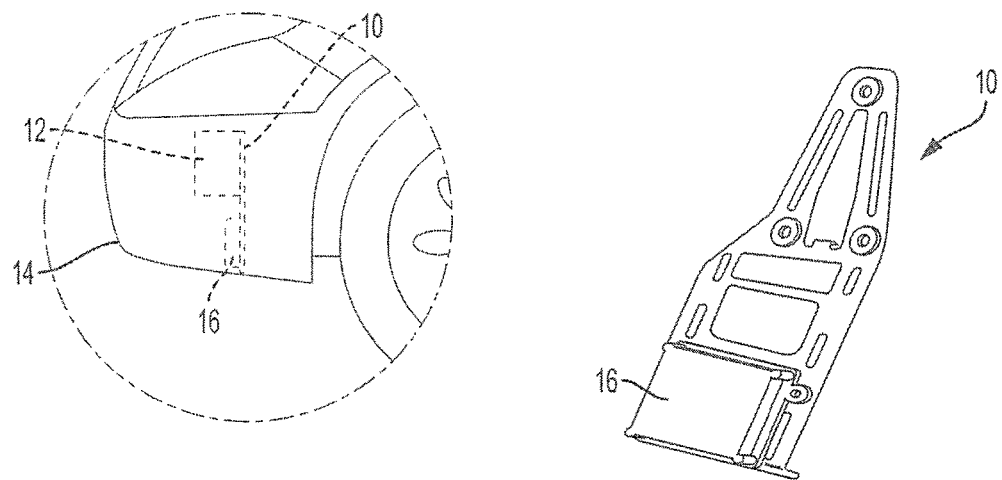
FIG. 1B
FIG. 1C

RESETTABLE TRANCEIVER BRACKET

INTRODUCTION

Long Range Radar (LRR) transceivers generally mount to the bumper of a corresponding vehicle by way of a bracket mount. Such bracket mounts are useful in that they enable simple access and removal of the LRR module from the vehicle. However, the design of LRR module brackets can be limited in that the bracket is unable to release kinetic energy absorbed from external forces. As such, after the bracket has been impacted by a force of sufficient mass and speed, the malleable construction of the bracket will bend and is generally unable return back to its original shape. Such bending may in turn change the direction in which the LRR transceiver faces as well as the direction the LRR radio waves may be projected. When the bracket is sufficiently bent, the LRR module may itself be rendered inoperable. It is therefore desirable for an LRR bracket to be designed to release kinetic energy absorbed from external force impacts and thus enabling the bracket to return to its original shape.

SUMMARY

A resettable tranceiver bracket is herein presented. The bracket is configured to mount a transceiver to a select piece of a vehicle. The bracket includes a first piece and a second piece configured to be pivotably connected to each other. A docking station is mounted to the first piece. The docking station includes a bluff, an over-travel stop, and a plurality of arms configured to restrict pivotable movement of the second piece in relation to the first piece. A snap-fit element is mounted to the second piece. The snap-fit element is configured to dock into the docking station to substantially create the pivotable connection between the first and the second piece. A spring is installed at the pivotable connection between the first and second pieces. The spring is configured to allow the second piece to automatically return to a default position after being pivoted in relation to the first piece.

The first and second pieces may be constructed from metallic material. The snap-fit element may be magnetic and may releasably docks into the docking station in an interlocked manner at least partly established through magnetic properties. The snap-fit feature may further include a bulb that is configured to establish the interlocking manner in which the snap-fit element is releasably docked into the docking station. The over-travel stop may include a slit configured to reduce insertion force while the snap-fit feature is being docked into the docking station. The over-travel stop may include a slit configured to reduce the spring force required to automatically return the second piece to the default position. The interior side of each of the arms may be formed at an angular incline to reduce the pivotable movement force of the snap-fit feature.

BRIEF DESCRIPTION OF THE DRAWINGS

FIG. 1A shows an exemplary vehicle having a known Long Range Radar (LRR) bracket mounted to the vehicle body in a known manner;

FIG. 1B is a close up of the mounted known LRR bracket;

FIG. 1C is the known LRR bracket without being mounted to the exemplary vehicle;

DETAILED DESCRIPTION

Figure 2A:
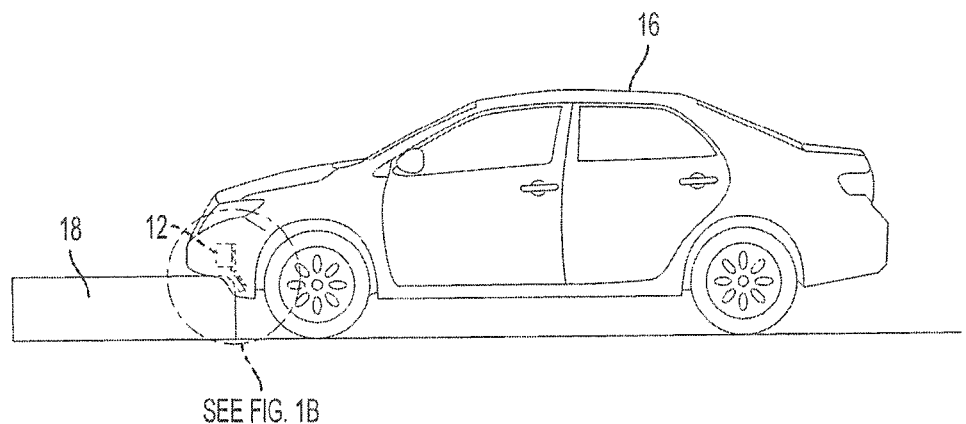
FIG. 2A shows the exemplary vehicle after impacting an object and the effects of the impact on the known LRR bracket.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As shown in FIGS. 1A-1C, the body of a Long Range Radar (LRR) module brackets 10 may generally be constructed from a malleable, metallic material such as steel. The body generally has an LRR transceiver base section with a mounting wing spanning therefrom. The mounting wing, extending from the upper half of the base section, includes two angular prongs which meet at the distal end to form a first mounting section. In certain instances, Bracket 10 may include a smaller second wing (not shown), extending from the lower half of the base section, which includes one prong with a second mounting section located at the distal end of the second wing.

When mounted in a typical fashion, bracket 10 mounts to a mounting block 12 on the interior side of the bumper 14 of a vehicle 16. Mounting block 12 is generally located at the middle of bumper 12 such that body of bracket 10 may be substantially positioned to hang beneath the entirety of bumper 12. Configuring bracket 10 to hang in this fashion allows the radio signal transmitting components of the LRR transceiver 16 to be directed outwardly so as to project its signals forward from vehicle 16 and focus on various objects located at a certain distance in front of vehicle 14. Fasteners such as, but not limited to, screws or bolts and nuts allow bracket 10 to mount to block 12. A protective cage (not shown) may also be fastened to bracket 10 to protect LRR transceiver 16 from damage. It should be appreciated that LRR transceiver 16 may otherwise be known as an LRR sensor box by those skilled in the art. It should be further appreciated that bracket 10 may also be constructed from materials other than metallic materials, such as, but not limited to, certain types of polymers and fiber glass.

Figure 2B:
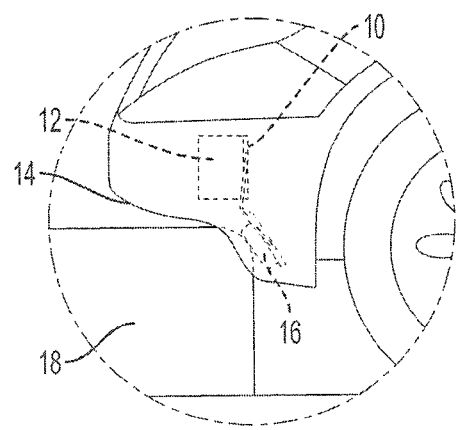
FIG. 2B shows a close up of the affected known LRR bracket.

With additional reference to FIGS. 2A and 2B, after vehicle 14 has collided with an external object 18 (e.g., a curb, tree, animal, etc.), the substantial impact of external forces may cause bending of the malleable metallic material constructing bracket 10. Moreover, when bracket 10 is sufficiently bent out of shape, LRR transceiver 16 may become disoriented and thus unable to project radio waves in their proper direction. This often renders LRR transceiver 16 inoperable and may even create hazardous situations when transceiver 16 has been installed in an autonomous vehicle (i.e., self-governing vehicles capable of sensing the surrounding environment and navigating without human input) or semi-autonomous vehicle. Such damage is therefore most often required to be rectified before vehicle 14 can be returned to an operable state.

Figure 3:
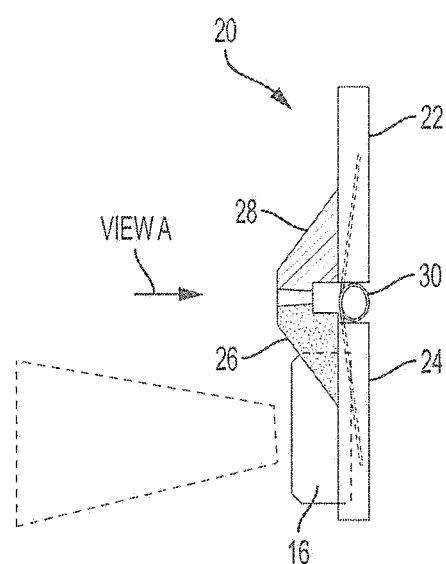
FIG. 3 shows aspects of an exemplary resettable transceiver bracket.
Figure 4:
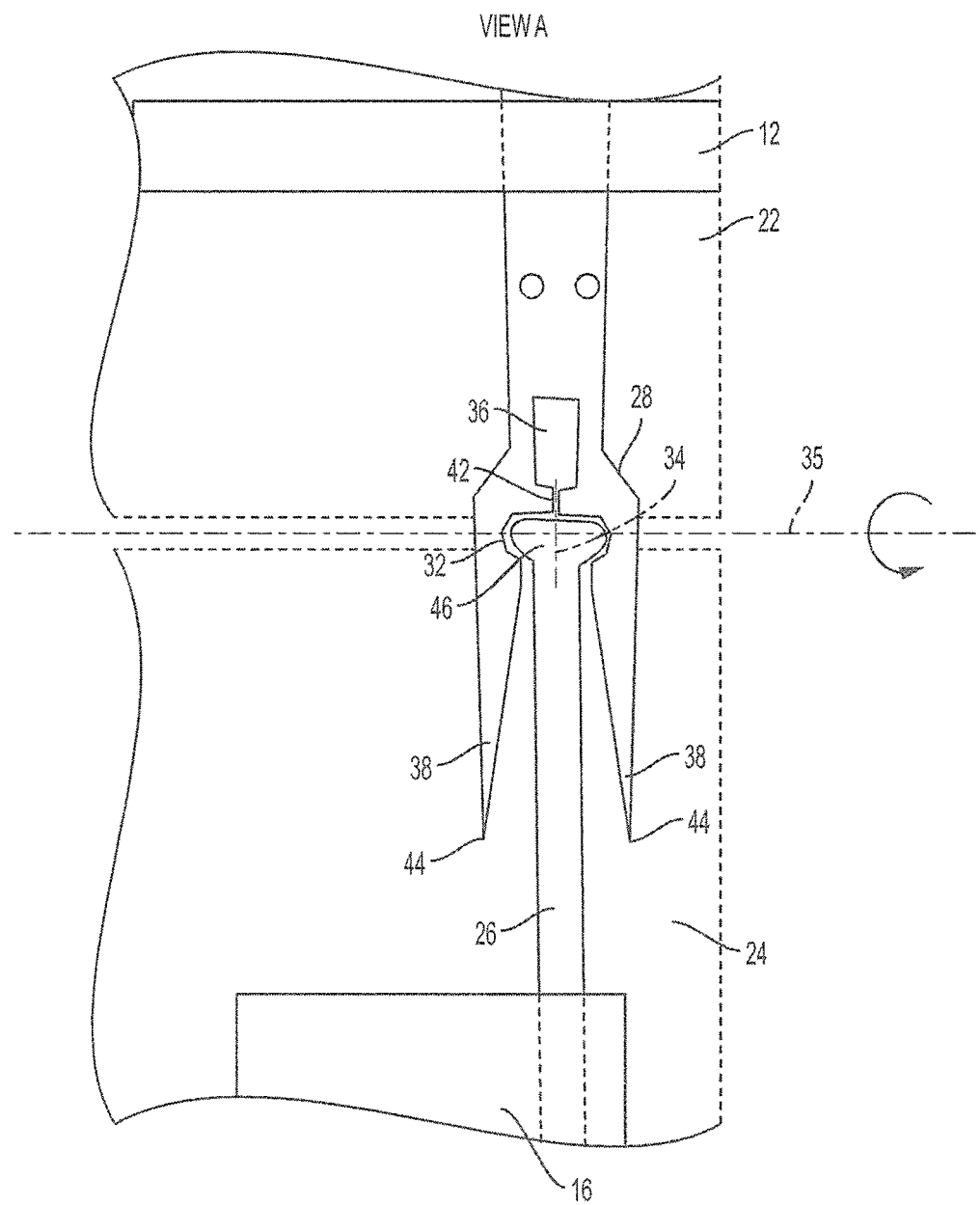
FIG. 4 shows a front-facing view of the exemplary resettable transceiver bracket of FIG. 3.

To address the issue of undue bending, as shown in FIGS. 3 and 4, an exemplary resettable bracket configured to mount to and hang LRR radar transceiver 16 (i.e. sensor box) from bumper 12 is generally indicated by reference number 20. As shown, resettable bracket 20 includes a first piece 22 and a second piece 24 being pivotally connected to each other via a fitting element 26 which is releasably docked into a docking station 28. A spring 30 is also installed at the pivotal connecting between first piece 22 and second piece 24. It should be appreciated that bracket 20 may also be configured to mount to and hang other transceivers which are not LRR transceivers, such as (but not limited to) RADAR and LIDAR transceivers.

According to one exemplary aspect of bracket 10, the first piece 22 and second piece 24 are each constructed from a metallic material such as (but not limited to) steel. The first piece 22 and second piece 24 moreover each have a number of fastener orifices (not shown) that allow for the docking station 28 and fitting element 26 to mount thereon, respectively. Skilled artisans will moreover see that fasteners such as (but not limited to) screws or bolts and nuts may be used to fasten docking station 28 to first piece 22 as well as fitting element 26 to second piece 24.

According to this exemplary aspect and as can be seen, when no external forces are acting on bracket 10, second piece 24 is established to rest at a default position relative to first piece 22 in which both pieces are substantially in a direct alignment with each other. This configuration further enables the transceiver to hang directly below (and often abutting) bumper 12 when transceiver 16 is mounted to second piece 24 in an exemplary manner.

Docking station 28 predominantly includes a bluff 32 with an ovular shaped cross section 34, an over-travel stop 36, and two substantially identical arms 38 protruding peripherally from docking station 28. The ovular cross-section 34 forms shoulders 40 at the distal bluff entryway. These shoulders 40 help fitting element 26 stay put after being properly docked into docking station 28, discussed below.

The over-travel stop 36 is a rectangular cavity centrally located in the body of docking station 28 that may include a slit 42 at its bottom end and which abuts bluff 32. Slit 42 may absorb the kinetic energy created by an impact against bracket 20 (particularly when such and impact forces second piece 24 to move in non-traditional directions such as from left to right) and in turn release the energy as stop 36 returns to its original shape. After external forces cause deflection movement of second piece 24 to a non-default position (i.e., a 15°-45° pivot from the default position), slit 42 may also reduce the amount of energy required for spring 30 to return second piece 24 to the default position.

The arms 38 restrict the pivotable movement of second piece 24. The arms 38 do not allow the second piece 24 to rotate pivotally 35 beyond a certain angle (e.g., 29°) in relation to first piece 22. The interior side of each arm 38, the side that faces towards fitting element 26 (when docked) and bluff 32, is formed at an angle which spans from the arm's proximal end (which abuts bluff 32) to the arm's distal end 44. The angle is considered to be at an incline due to the corresponding arm 38 being thickest at the proximal end and gradually thinning out such that arm 38 reduces to an edge at the distal end 44. As such, in those examples of bracket having two arms 38, as shown, the entryway between the arms 38 is narrowest at the location of entrance into bluff 32 and widest at the location abutting the distal ends 44 of arms 38. This inclined angle thus helps to reduce the force required to properly dock fitting element 26 by helping to guide the element into bluff 32, such that excessive energy and force are not required to properly dock fitting element 26.

Fitting element 26 is constructed of a rigid material and, as discussed above, releasably docks into docking station 28. When the docking process is complete, a pivotable connection 35 between first piece 22 and second piece 24 is made indirectly through the docked relationship of element 26 and station 28. Fitting element 26 moreover includes a bulb 46 which may be of a uniform width and that has a substantially wider, ovular-shaped cross-section than that of the ovular cross-section 34 of bluff 32. When docked, as such, portions of bulb 46 catch on the shoulders 40 of bluff 32 and form a releasably interlocked relationship between fitting element 26 and bluff 32. This relationship requires a substantial amount of pull force to release fitting element 26 from being docked. It should be appreciated that fitting element 26 may be constructed from rigid materials, such as, but not limited to, certain types of metallic materials, polymers, and fiber glass.

Spring 30 is of a substantial thickness and stiffness (e.g., 350 kN-mm/rad-to achieve 75 Hz pivot resonant frequency). Spring 30 is also interposed between the first and second pieces 22, 24 and is mounted directly to each piece. As known in the art, when second piece 24 is moved to a non-default position (i.e., being pivoted 15°-45° by an external object as discussed above), spring 30 absorbs, temporarily stores, and subsequently releases the kinetic energy (i.e., load force) of this movement. When releasing kinetic energy, the spring torque thus automatically returns second piece 24 to its default position (i.e., being aligned with first piece 22). The inclined angles of the interior sides of arms 34 may also help to reduce the load force required by spring 30 to return second piece 24 to the default position, by assisting to stabilize fitting element 26 during this pivoting interaction 35. Bluff 32 and bulb 46 may have corresponding, interactive ovular cross-sections 34 to further assist in stabilizing fitting element 26. When station 28 is constructed from metallic material, fitting element 26 may also be constructed from magnetic material that attracts to and interlocks with station 28 and thus at least partly assists in stabilizing fitting element 26 after being pivoted 35. It should be appreciated that spring 30 may be mounted to one or both of the first piece 22 and second piece 24 through the implementation of fasteners such as, but not limited to, nails, mounting brackets, screws or bolts and nuts.

While exemplary aspects of bracket 10 are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A resettable bracket configured to mount a transceiver to a select piece of a vehicle, the bracket comprising:
   a first piece and a second piece configured to be pivotably connected to each other;
   a docking station mounted to the first piece, the docking station comprising:
      a bluff;
      an over-travel stop; and
      a plurality of arms configured to restrict pivotable movement of the second piece in relation to the first piece;
   a fitting element mounted to the second piece, the fitting element configured to dock into the docking station to substantially create the pivotable connection between the first and second piece; and
   a spring installed at the pivotable connection between the first and second pieces, the spring configured to allow the second piece to automatically return to a default position after being pivoted in relation to the first piece.

2. The bracket of claim 1, wherein the first and second pieces are constructed from metallic material.

3. The bracket of claim 1, wherein the fitting element is magnetic and releasably docks into the docking station in an interlocked manner at least partly established through magnetic properties.

4. The bracket of claim 3, wherein the fitting feature comprises a bulb configured to establish the interlocked manner in which the fitting element is releasably docked into the docking station.

5. The bracket of claim 1, wherein the over-travel stop comprises a slit configured to reduce insertion force while the fitting feature is being docked into the docking station.

6. The bracket of claim 1, wherein the over-travel stop comprises a slit configured to reduce the spring force required to automatically return the second piece to the default position.

7. The bracket of claim 1, wherein the interior side of each of the plurality of arms is formed at an angular incline to reduce the pivotable movement force of the fitting feature.

8. A transceiver mounting system, the mounting system comprising:
   a vehicle;
   a rescuable bracket mounted to the vehicle, the bracket comprising:
      a first piece and a second piece configured to be pivotably connected to each other;
      a docking station mounted to the first piece, the docking station comprising:
         a bluff;
         an over-travel stop; and
         a plurality of arms configured to restrict pivotable movement of the second piece in relation to the first piece;
      a fitting element mounted to the second piece, the fitting element configured to dock into the docking to substantially create the pivotable connection between the first and second piece; and
      a spring installed at the pivotable connection between the first and second pieces, the spring configured to allow the second piece to automatically return to a default position after being pivoted in relation to the first piece; and
      a transceiver mounted to the second piece of the mounting bracket.

9. The bracket of claim 8, wherein the first and second pieces are constructed from metallic material.

10. The bracket of claim 8, wherein the mounting bracket is mounted at the vehicle bumper.

11. The bracket of claim 10, wherein the transceiver is configured to hang below the vehicle bumper.

12. The bracket of claim 8, wherein the fitting element is magnetic and releasably docks into the docking station in an interlocked manner at least partly established through magnetic properties.

13. The bracket of claim 12, wherein the fitting feature comprises a bulb configured to establish the interlocked manner in which the fitting element is releasably docked into the docking station.

14. The bracket of claim 8, wherein the over-travel stop comprises a slit configured to reduce insertion force le the fitting feature is being docked into the docking station.

15. The bracket of claim 8, wherein the over-travel stop comprises a slit configured to reduce the spring force required to automatically return the second piece to the default position.

16. The bracket of claim 8, wherein the interior side of each of the plurality of arms is formed at an angular incline to reduce the pivotable movement force of the fitting feature.

17. A transceiver mounting system, the mounting system comprising:
   a vehicle;
   a mounting bracket mounted to the vehicle bumper, the mounting bracket comprising:
      a first piece and a second piece configured to be pivotably connected to each other;
      a docking station mounted to the first piece, the docking station comprising:
         a bluff;
         an over-travel stop comprising a slit configured to reduce spring force required for pivotal movement of the second piece in relation to the first piece; and
         a plurality of arms configured to restrict the pivotable movement, the interior side of each of the plurality of arms is formed at an angular incline to reduce the pivotable movement force of the second piece;
      a fitting element mounted to the second piece, the fitting element configured to releasably dock into the docking station to substantially create the pivotable connection between the first and second piece, the fitting element comprising a bulb end configured to relasably interlock the fitting element within the docking station after being docked; and
      a spring installed at the pivotable connection between the first and second pieces, the spring configured to allow the second piece to automatically return to a default position after being pivoted in relation to the first piece; and
      a transceiver mounted to the second piece of the mounting bracket.

18. The bracket of claim 16, wherein the slit is further configured to reduce insertion force of the fitting element while being releasably docked into the docking station.

19. The bracket of claim 16, wherein the first and second pieces are constructed from metallic material.

20. The bracket of claim 16, wherein the bluff has a substantially ovular cross section.

\* \* \* \* \*